(12) United States Patent
Dannhauer et al.

(10) Patent No.: US 8,127,615 B2
(45) Date of Patent: Mar. 6, 2012

(54) METHOD FOR EMBOSSING A SEPARATING MEMBRANE OF A PRESSURE TRANSFER MEANS

(75) Inventors: Wolfgang Dannhauer, Sandersdorf (DE); Igor Getman, Lörrach (DE); Harri Notacker, Caputh (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 12 days.

(21) Appl. No.: 12/312,723

(22) PCT Filed: Nov. 27, 2007

(86) PCT No.: PCT/EP2007/062843
§ 371 (c)(1),
(2), (4) Date: Jan. 28, 2010

(87) PCT Pub. No.: WO2008/065094
PCT Pub. Date: Jun. 5, 2008

(65) Prior Publication Data
US 2010/0162820 A1   Jul. 1, 2010

(30) Foreign Application Priority Data
Nov. 29, 2006   (DE) .................. 10 2006 056 592

(51) Int. Cl.
*G01L 7/00*   (2006.01)

(52) U.S. Cl. ............................................. 73/706; 73/715
(58) Field of Classification Search .................. None
See application file for complete search history.

(56) References Cited

U.S. PATENT DOCUMENTS

| 4,053,418 | A | * | 10/1977 | Newman | 210/321.74 |
|---|---|---|---|---|---|
| 5,495,768 | A | | 3/1996 | Louwagie | |
| 2006/0117945 | A1 | * | 6/2006 | Burczyk et al. | 92/96 |
| 2008/0075404 | A1 | * | 3/2008 | Chin et al. | 385/12 |
| 2009/0086214 | A1 | * | 4/2009 | Chin et al. | 356/480 |

FOREIGN PATENT DOCUMENTS

| DE | 100 31 120 A1 | 1/2002 |
|---|---|---|
| DE | 101 52 681 A1 | 4/2003 |
| DE | 101 62 044 A1 | 6/2003 |
| DE | 10 2005 004 942 A1 | 8/2006 |
| EP | 0 655 615 A1 | 5/1995 |

* cited by examiner

*Primary Examiner* — Andre Allen
(74) *Attorney, Agent, or Firm* — Bacon & Thomas, PLLC

(57) ABSTRACT

A method for embossing a separating membrane of a pressure transfer means including a membrane carrier having a membrane bed. With the method, an optimal forming of the separating membrane matched to the form of the membrane bed is achievable. The method includes steps of: welding a planar, separating membrane blank onto the membrane carrier; filling with a lubricant a pressure receiving chamber enclosed by the welded, separating membrane blank and the membrane carrier; producing the separating membrane from the separating membrane blank by embossing the separating membrane blank by pressing it against the membrane bed while lubricant is present in the pressure receiving chamber.

9 Claims, 2 Drawing Sheets

METHOD FOR EMBOSSING A SEPARATING MEMBRANE OF A PRESSURE TRANSFER MEANS

TECHNICAL FIELD

The invention relates to a method for embossing a separating membrane of a pressure transfer means. Pressure transfer means are also referred to with the terms, pressure mediator, diaphragm seal, and chemical seal

BACKGROUND DISCUSSION

Pressure transfer means are applied in industrial pressure measuring technology for transferring pressures. Pressure transfer means include, as a rule, a membrane, or diaphragm, carrier, on which the separating membrane, or diaphragm, is welded at its outer edge. A pressure receiving chamber enclosed between the separating membrane and the membrane bed is filled with a pressure transfer liquid, which serves for transferring to another location, e.g. via a pressure transfer line connected to the pressure receiving chamber, a pressure acting externally on the separating membrane.

Typical applications for such pressure transfer means are pressure measuring transducers. Pressure measuring transducer are applied in almost all branches of industry for measuring pressures. The measured pressure values are used, e.g. for control (open, or closed loop, control) and/or for monitoring of an industrial, manufacturing, and/or treatment, process.

Popular in pressure measuring technology is the application of so called "semiconductor sensors", e.g. silicon chips containing doped resistance elements sensitive to pressure. Usually, such a pressure sensor includes a pressure sensor chip in the form of a membrane mounted in a pressure measuring chamber on a platform. Pressure sensors are, as a rule, very sensitive and are, therefore, not directly subjected to a medium, whose pressure is to be registered. Instead, a liquid filled, pressure transfer means having an outer, separating membrane is interposed. In operation, the pressure to be measured acts on the separating membrane and is transferred via the pressure transfer means into the pressure measuring chamber. The is true both for the measuring of absolute pressures, as well as also for the measuring of relative pressures and pressure differences.

In order to achieve a pressure transfer characteristic which is as linear and hysteresis free as possible, the separating membrane is preferably formed to be wave shaped.

The membrane bed integrated in the membrane carrier provides overload protection for the separating membrane. An overload refers to an acting on the separating membrane of a pressure, which exceeds the measuring range, for which the pressure measuring transducer is designed, or the pressure range for which the pressure transfer means is designed. In such case, it is especially important, that the membrane bed and the separating membrane are as equal in form as possible, so that the separating membrane, in the case of an overload, rests uniformly against the equally formed membrane bed and experiences a uniform support. In this way, the separating membrane, in the case of overload, is protected from damage and/or permanent deformation.

The forming of the separating membrane is usually done today by embossing.

In such case, for example, a planar, separating membrane blank is embossed by means of a metal punch, an elastic, embossing pad or the hydraulic, or pneumatic, embossing method and then welded onto the membrane carrier. Subsequently, the pressure transfer means is filled with the pressure transfer liquid.

This method offers the advantage, that the separating membranes can be prefabricated, wherein they are, for example, cut out and embossed in one working step. It has the disadvantage, that weld stresses, as well as warping of the separating membrane possibly occurring during the welding of the separating membrane onto the membrane carrier, become permanent. These degrade the pressure transfer characteristics of the pressure transfer means. Especially, they act disadvantageously on the linearity and can cause hysteresis.

Moreover, in the case of this method, very high requirements are placed on the manufacturing tolerances for the individual components, in order to achieve, that the separating membrane and its membrane bed are as equal in form as possible. Each still small deviation in the forming can, in the case of overload, lead to a permanent deformation or even to damage of the separating membrane and acts therewith disadvantageously on the accuracy and the reproducibility of the pressure transfer. This effects then, directly, the accuracy of measurement of a pressure measuring transducer equipped with the pressure transfer means.

Alternatively to the aforementioned method, the separating membrane blank can first be welded onto the membrane carrier and then embossed by pressing the blank against the membrane bed. This embossing can happen, for example, hydraulically, pneumatically or by means of an embossing pad. Then, the pressure transfer means is filled with the pressure transfer liquid.

This offers the advantage, that manufacturing tolerances in the forming of the membrane bed are assumed when the separating membrane is embossed by pressing against the membrane bed, and that weld stresses as well as warping of the separating membrane can be, at least partially, cancelled by the embossing procedure. Moreover, the separating membrane experiences, during the embossing against the membrane bed, mechanical loadings similar to those experienced in the case of a later, possibly arising overload.

In the case of the aforementioned embossing method, the forming of the separating membrane depends on the physical character of the medium enclosed, before and during the embossing, between the separating membrane and the membrane bed. Both moisture enclosed in the intermediate space, as well as also dust and/or enclosed particles affect the forming. This has the result, that individual pressure transfer means manufactured in the same way can have very different pressure transfer characteristics. For the use of these pressure transfer means for measuring of pressures, this means, as a rule, that complex calibration, or compensation, methods must be performed for each individual pressure measuring transducer.

SUMMARY OF THE INVENTION

It is an object of the invention to provide a method for embossing a separating membrane of a pressure transfer means, with which method an optimal forming of the separating membrane, matched to the form of the membrane bed, is achievable.

For this, the invention resides in a method for embossing a separating membrane of a pressure transfer means including a membrane carrier having a membrane bed, wherein the method comprises steps as follows:
Welding a planar, separating membrane blank onto the membrane carrier;

filling with a lubricant a pressure receiving chamber enclosed by the welded, separating membrane blank and the membrane carrier; and producing the separating membrane from the separating membrane blank by embossing the separating membrane blank by pressing it against the membrane bed while lubricant is present in the pressure receiving chamber.

In a preferred embodiment, the lubricant is a pressure transfer liquid.

In an additional embodiment, after welding the separating membrane blank, the seal of the welded connection is checked.

In an additional embodiment, the pressure receiving chamber is evacuated before the filling with the lubricant.

Additionally, the invention resides in a method for manufacture of a pressure measuring transducer, wherein the pressure measuring transducer comprises a pressure sensor arranged in a pressure measuring chamber, and a pressure transfer means filled with a pressure transfer liquid and connected in front of the pressure measuring chamber, wherein the pressure transfer means includes, mounted on a membrane carrier having a membrane bed, a separating membrane, against the outer surface of which there acts during measurement operation a pressure to be measured, which is transferred via the separating membrane and a pressure transfer liquid into the pressure measuring chamber, wherein the method comprises:

Welding a planar, separating membrane blank onto the membrane carrier;

filling with a lubricant a pressure receiving chamber enclosed by the welded, separating membrane blank and the membrane carrier; and producing the separating membrane from the separating membrane blank by embossing the separating membrane blank by pressing it against the membrane bed, while lubricant is present in the pressure receiving chamber.

Additionally, the invention resides in a pressure transfer means, comprising:

a membrane carrier having a membrane bed; and a separating membrane mounted on the membrane carrier; wherein the separating membrane has a form corresponding to the form of the membrane bed, wherein the form of the separating membrane was achieved by welding a planar, separating membrane blank onto the membrane carrier, filling with a lubricant a pressure receiving chamber enclosed by the welded, separating membrane blank and the membrane carrier, and embossing the separating membrane blank by pressing it against the membrane bed, wherein the separating membrane assumes, following its embossing, an equilibrium position (relative to the membrane bed) effected by the lubricant.

Additionally, the invention resides in a pressure transfer means, comprising:

a membrane carrier having a membrane bed; and a separating membrane mounted on the membrane carrier; wherein the separating membrane has a form corresponding to the form of the membrane bed, wherein the form of the separating membrane was achieved by welding a planar, separating membrane blank on the membrane carrier, filling with a lubricant a pressure receiving chamber enclosed by the welded, separating membrane blank and the membrane carrier, and embossing the separating membrane blank by pressing it against the membrane bed, wherein, between the membrane bed and the separating membrane in an equilibrium state, there is a separation, which is reduced through the use of the lubricant.

Likewise, the invention resides in a pressure measuring transducer, comprising:

a pressure sensor arranged in a pressure measuring chamber; and a pressure transfer means filled with a pressure transfer liquid and connected in front of the pressure measuring chamber, wherein the pressure transfer means includes, mounted on a membrane carrier having a membrane bed, a separating membrane, against the outer surface of which there acts during measurement operation a pressure to be measured, which is transferred via the separating membrane and a pressure transfer liquid into the pressure measuring chamber;

wherein the separating membrane has a form corresponding to the form of the membrane bed, wherein the form of the separating membrane was achieved by welding a planar, separating membrane blank onto the membrane carrier, filling with a lubricant a pressure receiving chamber enclosed by the welded, separating membrane blank and the membrane carrier, and embossing the separating membrane blank by pressing it against the membrane bed, wherein the separating membrane assumes, following its embossing, an equilibrium position (relative to the membrane bed) effected by the lubricant.

Additionally, the invention resides in a pressure measuring transducer, comprising:

a pressure sensor arranged in a pressure measuring chamber; and a pressure transfer means filled with a pressure transfer liquid and connected in front of the pressure measuring chamber, wherein the pressure transfer means includes, mounted on a membrane carrier having a membrane bed, a separating membrane, against the outer surface of which there acts during measurement operation a pressure to be measured, which is transferred via the separating membrane and a pressure transfer liquid into the pressure measuring chamber, wherein the separating membrane has a form corresponding to the form of the membrane bed, wherein the form of the separating membrane was achieved by welding a planar, separating membrane blank onto the membrane carrier, filling with a lubricant a pressure receiving chamber enclosed by the welded, separating membrane blank and the membrane carrier, and embossing the separating membrane blank by pressing it against the membrane bed, wherein between the membrane bed and the separating membrane in an equilibrium state, there is a separation, which is reduced through the use of the lubricant.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
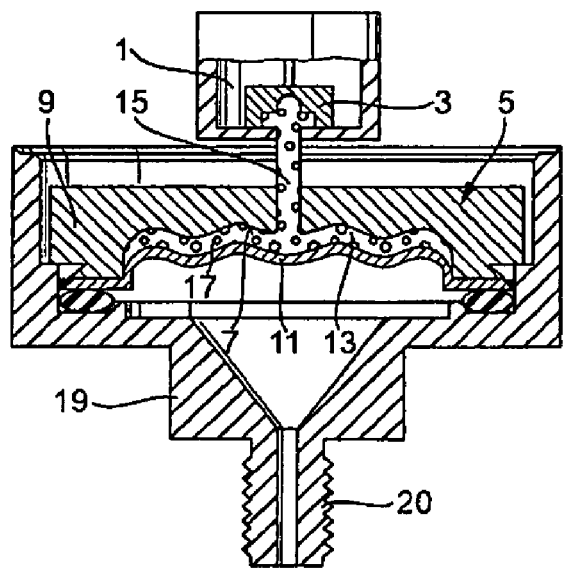
FIG. 1 a section through a pressure transducer having a pressure transfer means.

FIG. 1 shows a section through a pressure measuring transducer with a pressure sensor 3, e.g. a semiconductor sensor, arranged in a pressure measuring chamber 1. Suited for such application are e.g. silicon chips with doped resistance elements. The illustrated pressure measuring transducer is an absolute, pressure measuring transducer, such as is described, for example, in DE 101 62 044 A1 of Endress +Hauser. Correspondingly, the pressure sensor 3 here is an absolute pressure sensor. The invention is, however, not limited to absolute pressure measuring transducers, but, instead, is applicable in analogous form also in relative pressure, measuring transducers and pressure difference, measuring transducers.

Connected in front of the pressure measuring chamber 1 is a pressure transfer means 5. The pressure transfer means 5 has a membrane carrier 9 having a membrane bed 7, on which a separating membrane 11 is mounted. Separating membrane 11 and membrane bed 7 enclose a pressure receiving chamber 13 closed to the exterior. Pressure receiving chamber 13 is connected with the pressure measuring chamber 1 via a pressure transfer line 15.

The pressure measuring transducer has a closed inner space, which, in the illustrated example of an embodiment, includes the inner spaces of the pressure measuring chamber 1 and the pressure transfer means 5. The inner space of the pressure transfer means 5 is composed of the inner space of the pressure transfer line 15 and the inner space of the pressure receiving chamber 13. This closed inner space is filled with a pressure transfer liquid 17. The liquid 17 is preferably an incompressible liquid with a low thermal coefficient of expansion, e.g. a silicone oil. It serves in the measurement operation for transferring a pressure $p_M$ acting externally on the separating membrane 11 into the pressure measuring chamber 1 and, therewith, to the pressure sensor 3. Supply of the pressure $p_M$ occurs in the illustrated example of an embodiment via a process connection 19, into which the pressure transfer means 5 is inserted. The process connection 19 has a securement mechanism 20, here an external thread, with which the pressure measuring transducer is mountable at a measuring location.

The membrane bed 7 serves for the protection of the separating membrane 11 from overloads. If there acts on the separating membrane 11 a pressure $p_M$, which exceeds a predetermined upper limit, then the separating membrane 11 comes to rest on the membrane bed 7 and is thereby protected from permanent deformation or damage. In such case, it is especially important, that the form of the separating membrane 11 be optimally matched to the form of the membrane bed 7. The more exactly the two forms agree, the better is the protection provided by the membrane bed 7.

Figure 2:
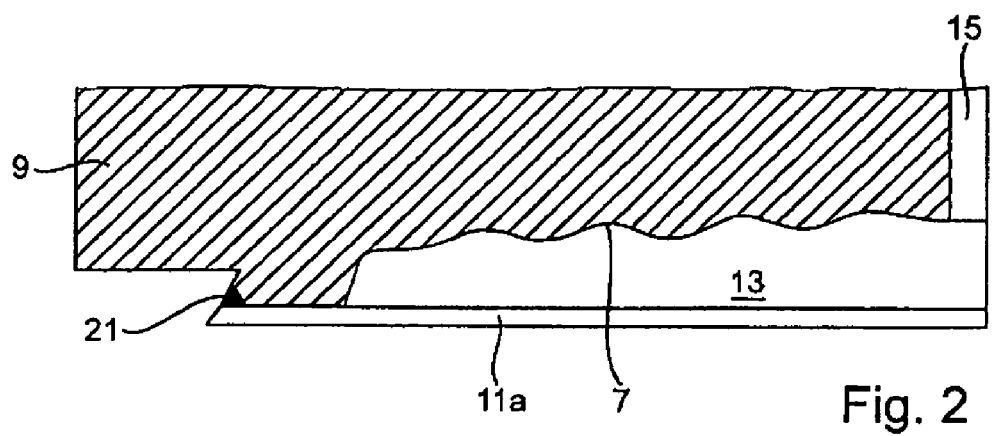
FIG. 2 a section of a membrane carrier with a planar, separating membrane blank welded on it.

For achieving an optimal agreement, according to the invention, the subsequently described method for embossing the separating membrane 11 of the pressure transfer means is used. The described method is applicable both for the manufacture of individual pressure transfer means 5 as well as also for manufacture of complete pressure measuring transducers. In a first method step, a planar metal disk, as separating membrane blank 11a, is welded onto the membrane carrier 9. FIG. 2 shows a section of the membrane carrier 9 with the planar, separating membrane blank 11a welded thereon. In such case, an outer edge of the separating membrane blank 11a is connected by a ring shaped, surrounding, weld seam 21 with an end face of the membrane carrier 9 adjoining the membrane bed 7.

Following the welding on of the separating membrane blank 11a, preferably the seal of the welded connection is checked. Suited for this are, for example, test methods commonly applied in pressure measuring technology, in the case of which the test specimen, here the inner space of the pressure measuring transducer, or the pressure receiving chamber 13 of the pressure transfer means 5, is filled under pressure with helium, and, by means of corresponding helium leak searchers, possibly occurring leakages are detected.

Thereafter, the pressure receiving chamber 13 is preferably evacuated and the evacuated pressure receiving chamber 13 filled with a lubricant. Used as lubricant is preferably the above discussed, pressure transfer liquid 17. If the method of the invention is for manufacture of a pressure measuring transducer, preferably, equally, the entire inner space of the pressure measuring transducer is evacuated and filled with the pressure transfer liquid 17.

Evacuation and filling occur, such as also in the case of conventional pressure transfer means, via at least one port providing access into the closed inner space, or into the pressure receiving chamber 13. In such case, it is, in the method of the invention, especially of advantage, that these two method steps be executed, while it is still the planar, separating membrane blank 11a that is closing the pressure receiving chamber 13. In this way, the entire pressure receiving chamber 13 is freely accessible and there are, especially, no narrow intermediate spaces or even separated compartments in the pressure receiving chamber 13, which would make difficult the evacuation and/or filling. If the pressure receiving chamber 13 were closed during these method steps already by a separating membrane in its final form fitted to the form of the membrane bed 7, then this separating membrane would under vacuum rest on its membrane bed. In such case, there is the danger, that the separating membrane would not rest everywhere completely on the membrane bed and especially in the intermediate spaces close to the edge region and, in the worst case, even completely isolated spaces arise in the pressure receiving chamber 13, which then are only evacuated insufficiently or even not at all. In this way, gas remains in these intermediate spaces, that subsequently remains also during the filling into the pressure receiving chamber and prevents a complete, bubble free filling.

Since evacuation and filling occur with a pressure measuring transducer closed with the planar, separating membrane blank 11a, a very high-quality evacuation and a practically bubble free filling are achievable, especially in the region of the pressure receiving chamber 13. A bubble free filling with the pressure transfer liquid 17, especially in the region of the pressure receiving chamber 13, leads to an increased vacuum stability of the pressure measuring transducer manufactured in this way. Therewith is meant, that the resulting pressure measuring transducer delivers clearly more exact measurement results in the case of a negative pressure acting externally on the separating membrane 11. Exactly in the case of a negative pressure acting externally on the separating membrane 11, gas bubbles enclosed under the separating membrane 11 act very disadvantageously, since they enlarge under negative pressure and change the pressure transfer behavior of the separating membrane 11, or of the entire pressure transfer means 5, which leads unavoidably to a reduction in the accuracy of measurement.

Likewise, the bubble freedom leads to an increased temperature stability of the achievable accuracy of measurement. Also temperature fluctuations lead to a change of the size of enclosed gas bubbles and therewith to a changed pressure transfer behavior.

Following the filling with lubricant, the separating membrane 11 is produced from the separating membrane blank 11a, by embossing the separating membrane blank 11a by pressing it against the membrane bed 7. This embossing can happen, for example, hydraulically, pneumatically or by means of an embossing pad.

Investigations of the assignee have shown, that the embossing procedure is influenced decisively by the sliding friction between the separating membrane 11 and its membrane bed 11a. This means, that the final form of a separating membrane embossed with application of lubricant clearly differs from its achievable final form without lubricant. The separating membrane assumes, relative to the membrane bed 9, an equilibrium position, brought about through the use of lubricant, that is changed compared to an embossing without lubricant. This is distinguished, especially, by an improved forming and by a small separation between separating membrane 11 and membrane bed 7.

During the embossing procedure, the sliding friction between the separating membrane blank 11a, or the separating membrane 11, is clearly reduced by the lubricant located in the pressure receiving chamber 13. This effects, at equal embossing pressure, a clearly improved and reproducible embossing of the separating membrane 11. Through the lubricant, influences of surface discontinuities or roughness both of the separating membrane blank 11a as well as also of the membrane bed 7 on the embossing procedure are clearly reduced. Through the presence of the lubricant, the separating membrane blank 11a slides during the embossing with greatly improved ease over the membrane bed 7, so that a very much higher agreement of the forming of separating membrane 11 and membrane bed 7 is achievable. Moreover, the mechanical loading, to which the separating membrane 11 is subjected during the embossing procedure, is reduced. It is possible, consequently, because of the presence of the lubricant, to exert higher embossing forces on the separating membrane 11, without tearing or damaging it.

Manufacturing tolerances in the forming of the membrane bed 7 are assumed by the separating membrane 11 as it is embossed by pressing it against the membrane bed 7.

Additionally, weld stresses as well as warping of the separating membrane blank 11a are at least partially removed by the embossing procedure.

While, in the case of an embossing procedure without lubricant, difficultly controllable variables, such as e.g. moisture or particles trapped between separating membrane and membrane bed, have, from embossing procedure to embossing procedure, a possibly highly variable influence on the final form of the separating membrane, when the embossing procedures are performed with lubricant, manufacturing conditions remain constant. This leads to a high reproducibility. This offers the advantage, that individual pressure transfer means, or pressure measuring transducers, manufactured with application of lubricant have almost identical pressure transfer characteristics. In this way, subsequent calibration, or compensation, procedures required for the pressure measurement can be clearly simplified and the achievable accuracy of measurement is improved.

The application of the lubricant effects not only equally permanent, reproducible, manufacturing conditions, but, also, a clearly improved forming. This forming improved through the method of the invention will now be explained in greater detail on the basis of results of a simulation performed using the finite element method, in which two embossing procedures were simulated.

Figure 3:
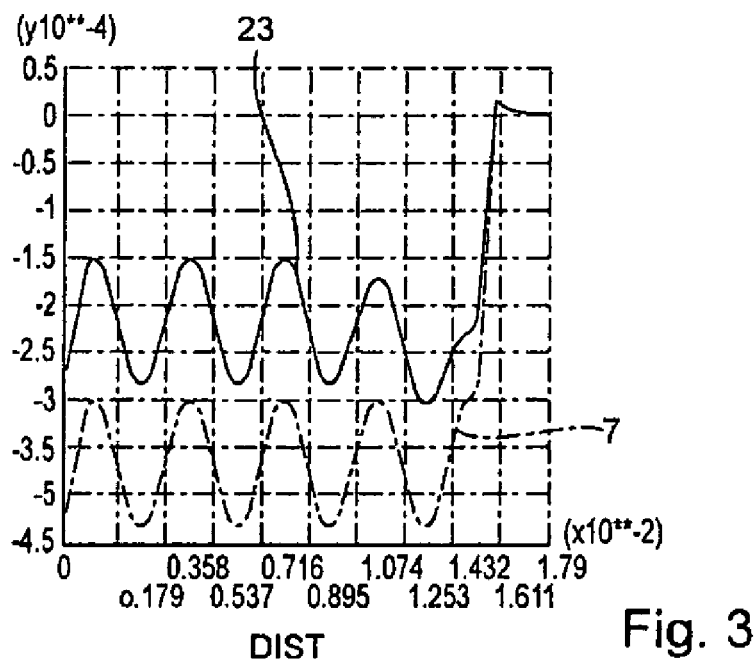
FIG. 3 plots of a separating membrane embossed without application of lubricant and the surface of its membrane bed.
Figure 4:
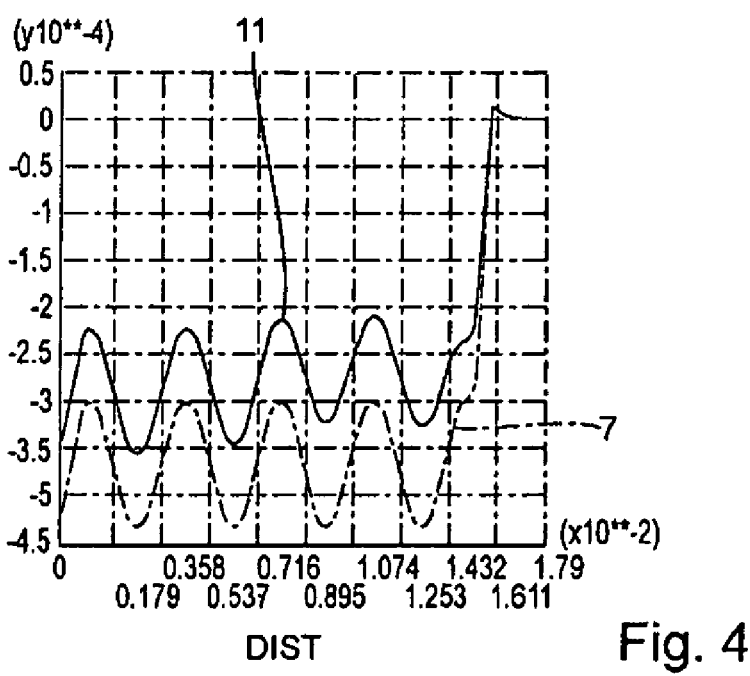
FIG. 4 plots of a separating membrane embossed with application of lubricant and the surface of its membrane bed.

FIG. 3 plots the surface of the membrane bed 7 and the final form of a separating membrane 23 embossed without lubricant. FIG. 4 plots the surface of the membrane bed 7 and the final form of a separating membrane 11 embossed with lubricant. Due to the existing symmetry, the curves in both figures are, in each case, only from the membrane bed center, or the separating membrane center, out to their respective outer edges. The axis coincides in the drawing with the zero point of the x-axis. Separating membrane 23, separating membrane 11 and membrane bed all have a radius of 16 mm. For the embossing procedure without lubricant, a coefficient of sliding friction of $\mu=0$ was used, and, for the embossing procedure with lubricant, a coefficient of sliding friction of $\mu=1$. A coefficient of sliding friction of $\mu=1$ is present, for example, when, as lubricant, a silicone oil usual for pressure transfer in pressure measuring technology is used. Used as starting point for the two simulation calculations was a planar, separating membrane blank 11a applied on the membrane carrier 9. Identical embossing procedures were used in both cases.

One sees on the basis of the simulation very clearly, that the separating membrane 11 embossed with lubricant matches very much form truely to the form of the membrane bed 7, as compared with the separating membrane 23 embossed without lubricant. The lubricant effects, thus, a unique change in the equilibrium position, which the separating membrane 11 assumes after the embossing. Moreover, the separation between the separating membrane 11 embossed with lubricant and its membrane bed 7 in the end state after the embossing illustrated in FIG. 4 is very much smaller than the separation between the separating membrane 23 embossed without lubricant and its membrane bed 7. In the case of the separating membrane 23 embossed without lubricant, the separation between the separating membrane 23 and its membrane bed 7 amounts at the center of the separating membrane 23 to 160 μm, while, in the case of the separating membrane 11 embossed with lubricant, such amounts, in contrast, to only 82 μm. This clearly smaller separation offers the advantage, that the internal volume of the associated pressure receiving chamber is markedly smaller. Therewith, the liquid volume of the pressure transfer liquid required for filling the pressure receiving chamber 13 is markedly smaller. This leads to a considerable reduction in the temperature dependence of the pressure transfer characteristics and therewith to an improving of the achievable accuracy of measurement.

A further advantage of the method of the invention is that the separating membrane 11 is subjected during the embossing to the same mechanical loadings as occur also in the case of a later, possibly arising case of overload. Both during the embossing as well as, thus, in the case of overload, liquid is located in the pressure receiving chamber 13. This leads, especially in connection with the forming of the separating membrane 11 optimized through the lubricant, to the fact that the separating membrane 11, in the case of overload, is optimally protected, and the separating membrane 11 experiences during a first occurrence of an overload, no additional permanent changes in form as a result of the overload.

In contrast, in the case of separating membranes, which were embossed without lubricant, a first occurrence of an overload can lead to permanent changes in form, since the mechanical loadings during a first case of overload can, on the basis of the pressure transfer liquid located in the pressure receiving chamber, differ from the mechanical loadings arising during the embossing without lubricant. These permanent form changes lead to a change of the transfer behavior and therewith to a change of the accuracy of measurement and the reproducibility.

The invention claimed is:

1. A method for embossing a separating membrane of a pressure transfer means including a membrane carrier having a membrane bed, comprising the steps of:
welding a planar, separating membrane blank onto the membrane carrier;
filling with a lubricant a pressure receiving chamber enclosed by the welded, separating membrane blank and the membrane carrier; and
producing the separating membrane from the separating membrane blank by embossing the separating membrane blank by pressing it against the membrane bed while lubricant is present in the pressure receiving chamber.

2. The method as claimed in claim 1, wherein:
the lubricant is a pressure transfer liquid.

3. The method as claimed in claim 1, wherein:
after the welding on of the separating membrane blank, the seal of the welded connection is checked.

4. The method as claimed in claim 1, wherein:
the pressure receiving chamber is evacuated before the filling with the lubricant.

5. The method for manufacture of a pressure measuring transducer, wherein the pressure measuring transducer comprises: a pressure sensor arranged in a pressure measuring chamber and a pressure transfer means filled with a pressure transfer liquid and connected in front of the pressure measuring chamber, wherein the pressure transfer means includes, mounted on a membrane carrier having a membrane bed, a separating membrane, against the outer surface of which there acts during measurement operation a pressure to be measured, which is transferred via the separating membrane and a pressure transfer liquid into the pressure measuring chamber, the method comprising the steps of:
welding a planar, separating membrane blank onto the membrane carrier;
filling with a lubricant a pressure receiving chamber enclosed by the welded, separating membrane blank and the membrane carrier; and
producing the separating membrane from the separating membrane blank by embossing the separating membrane blank by pressing it against the membrane bed while lubricant is present in the pressure receiving chamber.

6. A pressure transfer means, comprising:
a membrane carrier having a membrane bed; and
a separating membrane mounted on said membrane carrier, wherein:
said separating membrane has a form corresponding to the form of said membrane bed, which was achieved by a method comprising the steps of: welding a planar, separating membrane blank on said membrane carrier; filling with a lubricant a pressure receiving chamber enclosed by said welded, separating membrane blank and the membrane carrier; and embossing said separating membrane blank by pressing it against said membrane bed, wherein: said separating membrane assumes, following its embossing, an equilibrium position, relative to said membrane bed effected by the lubricant.

7. A pressure transfer means, comprising:
a membrane carrier having a membrane bed, and
a separating membrane mounted on said membrane carrier, wherein:
said separating membrane has a form corresponding to said form of said membrane bed, which was achieved by the method comprising the steps of: welding a planar, separating membrane blank on said membrane carrier; filling with a lubricant a pressure receiving chamber enclosed by said welded, separating membrane blank and said membrane carrier; embossing said separating membrane blank by pressing it against said membrane bed; and between said membrane bed and said separating membrane in an equilibrium state, there is a separation, which is reduced through the use of the lubricant.

8. A pressure measuring transducer, comprising
a pressure sensor arranged in a pressure measuring chamber; and
a pressure transfer means filled with a pressure transfer liquid and connected in front of said pressure measuring chamber, said pressure transfer means includes, mounted on a membrane carrier having a membrane bed, a separating membrane, against the outer surface of which there acts during measurement operation a pressure to be measured, which is transferred via said separating membrane and the pressure transfer liquid into said pressure measuring chamber, wherein:
said separating membrane has a form corresponding to the form of said membrane bed, which was achieved by a method comprising the steps of: welding a planar, separating membrane blank on said membrane carrier; filling with a lubricant a pressure receiving chamber enclosed by said welded, separating membrane blank and the membrane carrier; embossing said separating membrane blank by pressing it against said membrane bed; and said separating membrane assumes, following its embossing, an equilibrium position relative to said membrane bed effected by the lubricant.

9. A pressure measuring transducer, comprising:
a pressure sensor arranged in a pressure measuring chamber; and
pressure transfer means filled with a pressure transfer liquid and connected in front of said pressure measuring chamber, said pressure transfer means includes, mounted on a membrane carrier having a membrane bed, a separating membrane, against the outer surface of which there acts during measurement operation a pressure to be measured, which is transferred via said separating membrane and the pressure transfer liquid into said pressure measuring chamber, wherein:
said separating membrane has a form corresponding to the form of said membrane bed, which was achieved by a method comprising the steps of: welding a planar, separating membrane blank on said membrane carrier; filling with a lubricant a pressure receiving chamber enclosed by said welded, separating membrane blank and said membrane carrier; and embossing said separating membrane blank by pressing it against said membrane bed; and between said membrane bed and said separating membrane in an equilibrium state, there is a separation, which is reduced through the use of the lubricant.

* * * * *